United States Patent Office 2,970,207
Patented Jan. 31, 1961

2,970,207
METHOD AND DEVICE FOR ARC WELDING

Jacques Andre Stohr, Bures-sur-Yvette, France, assignor to Commissariat a l'Energie Atomique, Paris, France, a state administration Filed Nov. 20, 1958, Ser. No. 775,321

Claims priority, application France Nov. 21, 1957

9 Claims. (Cl. 219—131)

The invention relates to the arc welding art, i.e. to the art of welding metallic parts or workpieces by means of an electric arc struck between said workpieces, disposed the one against the other along the line along which the welding is to be carried on, and an arc electrode, and more specifically to the arc welding under vacuum.

It is well-known that an electric arc subsists only in the presence of an ionizable medium, said medium being e.g. a gas or a metallic vapour. The melting of a metal or alloy under vacuum by means of an electric arc demands therefore a quantity of metallic vapour sufficient for allowing an arc being struck; the globules of molten metal resulting from the local melting of the metallic parts due to the arc heat are vaporized, also by the heat generated by the arc, and a permanent arc is established through the vaporized globules between said metallic parts and the cooperating arc electrode disposed in an evacuated zone.

It is therefore necessary in order to produce an arc welding operation under vacuum:

First, to generate, between the arc electrode and the metallic parts to be welded, a metallic vapour thereby providing an ionized path for an electric arc between said arc electrode and said metallic parts, Secondly, to maintain a stable arc therebetween, while moving said metallic parts substantially perpendicularly to said arc, so as to realize the local melting of the metal along the line along which the welding is to be carried on.

The invention has therefore for an object to provide a method and a device for arc welding under vacuum, capable to provide during a starting period a metallic vapour in an evacuated zone wherein are disposed the adjoining metallic parts to be welded and at a distance therefrom an arc electrode, thereby producing an electric arc therebetween, and to maintain, during an operative period, a stable arc therebetween, any accidental arc failure automatically resulting in a new production of metallic vapour between said metallic parts and said arc electrode.

The invention has also for an object a method and a device for starting and automatically restarting in case of failure a welding electric arc under vacuum between metallic parts to be welded and an arc electrode.

It is also an object of the invention to provide a method and a device for arc welding metals or alloys having a high vaporization rate at low pressure, as magnesium, beryllium and their alloys, as well as metals and alloys having a medium vaporization rate at low pressure as zirconium.

It is another object of the invention to provide a method and a device for welding oxidizable metals or alloys without producing any oxidation thereof.

It is still another object of the invention to provide a method and a device allowing to realize the welding of metallic parts without occluding gas therein.

The method for arc welding a pair of metallic parts, according to the invention, comprises the steps of disposing in an evacuated zone an arc electrode, an electron source, adapted to produce when energized an electron beam focused on a restricted zone, and said metallic parts, with the edges thereof along which the welding is to be carried on disposed in adjoining position and traversing said restricted zone, of applying an operative low welding voltage between said parts and said arc electrode, of energizing said electron source, thereby hitting with an electron beam said restricted zone and producing a material vaporization of said metallic parts in said restricted zone, the produced metallic vapours ionizing the path between said restricted zone and said arc electrode thereby striking an electric arc between said parts and said arc electrode, the energization of said electron source being automatically produced by the absence of an electric arc along said path, and of moving said adjoining edges relatively to said restricted zone.

The device for arc welding a pair of metallic parts, according to the invention, comprises a chamber, means for evacuating said chamber, an arc electrode inside said chamber, a cathode disposed inside said chamber and adapted, when sufficiently negatively biased, to produce an electron beam, means for focalizing said electron beam in a restricted zone inside said chamber, means for supporting said metallic parts inside said chamber with the adjoining edges thereof along which the welding is to be carried on traversing said restricted zone, means for applying a low voltage between said metallic parts and said arc electrode, means adapted to apply a high negative potential on said cathode relatively to said metallic parts, means for rendering operative said last mentioned means when and only when no material ionization exists between said arc electrode and said metallic parts, and means for performing a relative displacement between said parts and said restricted zone.

In the preferred embodiment, the high and low voltages for starting, through an electron bombardment, and for sustaining the electric arc are obtained from a common source of electric potential (e.g. a source of alternating current) through a first high voltage transformer and a second low voltage transformer respectively; preferably the primary windings of said transformers are connected in parallel to the terminals of said source of electric potential and their secondary windings supply the starting high voltage and the operative low voltage respectively. A saturable reactor—having a variable impedance winding, connected in series with the primary winding of the high voltage transformer, across the terminals of said potential source, and a control or saturation winding controlled by the voltage drop or current between said arc electrode and said metallic parts—switching off the high voltage transformer by providing a high impedance in the supply circuit of the primary winding thereof, as soon as an arc is struck between the arc electrode and the metallic parts.

The aforesaid and other objects, features and advantages of the invention will be more easily and fully understood from the illustration of one embodiment of a vacuum arc welding device according to the invention, it being understood that the invention is not restricted to the details of the illustrated and described embodiment, but that it is susceptible to modifications and adaptations that will readily occur to someone skilled in the art.

Figure 1:
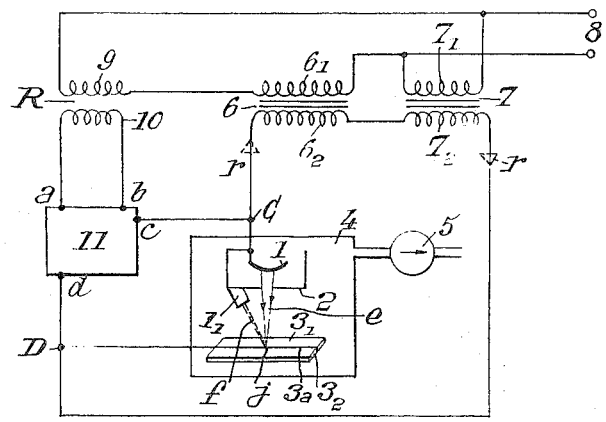
Figure 1 is a diagrammatic illustration of one form of embodiment of a device, according to the invention, for performing an arc welding under vacuum of metallic parts, said embodiment including a saturable reactor.

Reference being made to Fig. 1, in a fluid-tight container 4, evacuated by a pump 5 to a very low pressure (e.g. of about $10^{-3}$ mm. of mercury) are disposed:

On a movable stand (not shown in order to clarify the drawing), the two metallic parts or workpieces $3_1$ and $3_2$ to be welded, said parts being disposed, as shown, side by side, with their adjoining edges along a line $3a$ along which the welding is to be carried on;

An electron source constituted by a cathode 1, directly or indirectly heated as well known in the art of vacuum tubes, realized e.g. as shown by a thin filament made in or coated by a thermo-emissive material;

A focusing system for the electron beam $e$ produced by the cathode 1, when hot, said focusing system being constituted e.g. by a focusing electrode 2 electrically connected to said cathode 1;

An arc electrode $1_1$, which may for example be constituted, in the known manner by a cooled copper holder carrying a tungsten active electrode, said arc electrode $1_1$ being either electrically connected, as shown, to electrode 2 (and then suitable means not shown are provided for protecting the high voltage circuit as defined hereinunder from the arc high intensity) or separated therefrom.

The cathode 1 with the focusing electrode 2 is adapted to perform the starting operation when sufficiently negatively biased relatively to the workpieces $3_1$ and $3_2$, i.e. when a high voltage is applied between terminal C, electrically connected to elements 1 and 2, and terminal D, electrically connected either to workpieces $3_1$ and $3_2$ (as shown) or preferably to the stand (which is then made out of an electrical conducting material) on which rest said pieces.

The arc electrode $1_1$ is adapted to perform the welding operation, a low voltage being applied between arc electrode $1_1$ and workpieces $3_1$ and $3_2$, e.g. between terminals C and D, by establishing a permanent arc $f$ between $1_1$ and $3_1$—$3_2$ when an ionized metallic vapour exists between said arc electrode $1_1$ and workpieces $3_1$—$3_2$.

The arc starting and welding currents are furnished between terminals C and D by a pair of transformers 6 and 7 having the primary windings thereof (respectively $6_1$ and $7_1$) fed in parallel from a source of supply 8 of alternating current and the secondary windings thereof (respectively $6_2$ and $7_2$) serially connected between terminals C and D. The various windings $6_1$, $6_2$, $7_1$, $7_2$ are designed, as well known in the art, to constitute a high voltage transformer 6 and a low voltage transformer 7 adapted respectively to furnish the arc starting voltage between cathode 1 and workpieces $3_1$—$3_2$ and the arc welding voltage between the arc electrode $1_1$ and the workpieces $3_1$—$3_2$. The output currents from said transformers 6 and 7 may, if desired, be rectified by rectifiers $r$ shown in dotted lines. Suitable means are provided for rendering operative the high voltage transformer 6 for starting or re-starting the electric arc $f$ and for automatically switching off said transformer 6 when said arc is started, i.e. when the actual voltage drop between arc electrode $1_1$ and workpieces $3_1$—$3_2$ is reduced by said arc. Several means may be used for this automatic switching on and off.

Figure 2:
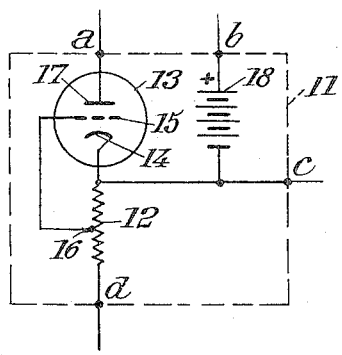
Figure 2 is a more detailed showing of a preferred embodiment of a portion of Fig. 1, i.e. of the control system for the saturable reactor thereof.

For example, as shown, said means may be constituted by a feed-back system comprising a saturable reactor R and a control unit 11 (shown in detail on Fig. 2) having the output circuit $ab$ thereof controlling said saturable reactor and the input circuit $cd$ thereof connected across the arc $f$, i.e. between terminals C and D.

The saturable reactor R comprises, in the known manner, a pair of magnetically linked windings, i.e. an impedance winding 9, serially connected to primary winding $6_1$ of the high voltage transformer 6 across the terminals of source 8, and a saturating winding 10 adapted to be energized by the output of said control unit 11. The degree of energization of the saturating winding 10 controls the effective impedance of winding 9 generally through a core (not shown) surrounded by the impedance winding 9: when the saturating winding is fully energized, the impedance winding will have a low value and current will flow through the high-voltage transformer 6; as the energization of the saturating winding decreases, the impedance value will increase and no current will pass through the high voltage transformer 6 which will be therefore cut-off.

The energization current for saturable reactor R may be derived as a portion from the current or voltage across terminals CD or $cd$, e.g. through a triode 13 receiving between the cathode 14 and grid 15 a current proportional to the voltage across terminals CD (the cathode 14 being electrically connected to terminal C and the grid 15 being electrically connected to a stationary point 16 on a resistor 12 disposed between $c$ and $d$, i.e. between C and D, in order to prevent a direct unimpeded flow from D to C), and delivering an amplified current to the saturating winding 10 of said saturable reactor R (the anode 17 being electrically connected to the positive terminal of a supply source 18 through said winding 10, whereas the negative terminal of source 18 is connected to cathode 14). In fact resistor 12 and triode 13 divert and amplify a selected portion of the load current.

Means are further provided for moving workpieces $3_1$—$3_2$ relatively to electrodes 1, $1_1$, 2, said means comprising e.g. a pinion and rack device acting on the stand not shown on which are disposed said workpieces for successively bringing the various points of the welding line $3a$ in front of point $j$ from where was struck the arc $f$ by impacts of electron beam $e$, thereby obliging the inferior arc terminal to scan the whole welding line $3a$.

The operating conditions may e.g. be the following ones

Supply source 8: 220 v. alternating current, e.g. the general supply mains;

Output of transformer 6: about 10.000 to 50.000 volts and about 5 ma.;

Output of transformer 7: about 150 volts before the establishing of the arc, and about 25–30 volts and about 70 A., when a permanent arc is established (the transformer 7 being e.g. a leakage transformer);

Distance between arc electrode 11 and point $j$: about 5–15 mm.;

Distance between filament 1 and point $j$: from about 1 inch to several feet.

The device functions as follows: Transformers 6 and 7 being fed by source 8 and chamber 4 being sufficiently evacuated to prevent any arc formation in the absence of metal vaporization, the potential difference between C and D is high: a large current flows through resistor 16 and the amplified output current of tube 13 is high; reactor R is fully saturated, the impedance of winding 10 thereof is low and the current from source 8 or the mains will continue to flow through primary winding $6_1$ (as well as through primary winding $7_1$) thereby delivering a high voltage across terminals CD i.e. across cathode 1 and workpieces $3_1$—$3_2$: an electron beam will hit at $j$ the adjoining edges (along welding line $3a$) of workpieces $3_1$ and $3_2$ and melt and vaporize the metal thereof. A half sphere of metallic vapor centered in $j$ will expand until the periphery of said half-sphere will reach arc electrode $1_1$ thereby establishing an ionizable path (at e.g. a pressure of about $10^{-2}$ mm. of mercury) between said electrode and point $j$. An arc will then rise therebetween, thereby drastically reducing the potential difference between C and D and therefore the current flowing through resistor 16; the amplified output current of tube 13 will be low; the impedance value of winding 10 of reactor R will increase and no current will pass through primary winding $6_1$: only low voltage transformer 7 will feed a voltage across terminals C and D, said voltage being a low voltage sufficient for maintaining a permanent arc between electrode $1_1$ and workpieces $3_1$—$3_2$, but insufficient for energizing the electron source 1.

The welding operation is then performed by moving workpieces $3_1$—$3_2$ relatively to point $j$, so that all points of welding line $3a$ pass in front of point $j$.

If an accidental arc failure takes place, the potential difference between terminals C and D will rise to a value sufficient for producing (as above-mentioned for the starting) a saturation of reactor R and thereby a flow of current through primary winding $6_1$; a high voltage is applied across C and D and electron source 1 is energized: a new cycle will start.

The device according to the invention provides therefore an automatic starting or re-starting (if an arc failure takes place) for a welding arc under vacuum, the units 11 and 9 acting as a quick action continuous switch for switching on and off starting high voltage transformer 6. Of course other types of switching relays may be used for switching on and off the high voltage for the electron source.

Although the invention has been described with reference to certain specific embodiments thereof, it is to be distinctly understood that various modifications and adaptations of the arrangements herein disclosed may be made as may readily occur to persons skilled in the art without constituting a departure from the spirit and scope of the invention as defined in the objects and in the appended claims.

What I claim is:

1. Device for arc welding a pair of metallic parts, comprising a chamber, means for evacuating said chamber, an arc electrode inside said chamber, a cathode disposed inside said chamber and adapted, when sufficiently negatively biased, to produce an electron beam, means for focalizing said electron beam in a restricted zone inside said chamber, means for supporting said metallic parts inside said chamber with the adjoining edges thereof along which the welding is to be carried on traversing said restricted zone, means for applying a low voltage between said metallic parts and said arc electrode, means adapted to apply a high potential on said cathode relatively to said metallic parts, means for rendering operative said last mentioned means when and only when no material ionization exists between said arc electrode and said arc ionization exists between said arc electrode and said metallic parts, and means for performing a relative displacement between said parts and said restricted zone.

2. A device for arc welding a pair of metallic parts comprising a chamber, means for evacuating said chamber, an electricity conducting stand in said chamber adapted to support said metallic parts, means for displacing said stand, an arc electrode inside said chamber at a reduced distance from said metallic parts, a source of an electron beam in said chamber at a distance from said metallic parts, means for focalizing said electron beam in a restricted zone on said metallic parts, a source of electrical potential with a pair of terminals, a first high voltage transformer with a primary winding and a secondary winding, a second low voltage transformer with a primary winding and a secondary winding, a saturable reactor with an impedance winding and a saturating winding, the primary winding of said first transformer with said impedance winding in series being connected in parallel with the primary winding of said second transformer across said pair of terminals, the secondary windings of said first and second transformers being connected between said metallic parts, on the one hand, and said arc electrode and said source of electron beam, on the other hand, and feed back means for delivering across said saturating winding a current increasing with the potential difference between said arc electrode and said metallic parts.

3. A device according to claim 2, wherein said feedback means comprise a resistor connected across said arc electrode and said metallic parts and amplifying means having an input connected across one portion of said resistor and on output delivering to said saturating winding.

4. A device according to claim 3, wherein said amplifying means is constituted by a triode with a cathode connected to said arc electrode, a grid connected to a point on said resistor and an anode delivering to said saturating winding.

5. A method for arc welding a pair of adjacent metallic parts along their adjoining edges, within an evacuated container having an electron source and an arc electrode therein, comprising the steps of applying an operative low welding voltage between said parts and said arc electrode, energizing said electron source and focusing the resulting electrons therefrom at a restricted zone, producing a vaporization of said parts along their adjacent edges and an ionization between said parts and said arc electrode by relative displacement of said adjoining edges and said restricted zone, whereby a welding arc will be struck between said arc electrode and said adjoining edges.

6. A method for arc welding a pair of adjacent metallic parts along their adjoining edges, within an evacuated container having an electron source and an arc electrode therein, comprising the steps of applying an operative low welding voltage between said parts and said arc electrode, energizing said electron source and focusing the resulting electrons therefrom at a restricted zone, producing a vaporization of said parts along their adjacent edges and an ionization between said parts and said arc electrode by moving said adjoining edges into said restricted zone, and traversing said adjacent edges through said restricted zone, whereby a welding arc will be struck between said arc electrode and said adjoining edges.

7. A method for arc welding a pair of adjacent metallic parts along their adjoining edges, within an evacuated container having an electron source and an arc electrode therein, comprising the steps of applying an operative low welding voltage between said parts and said arc electrode, applying a negative potential to the electron source relative to said parts only when no ionization exists between said arc electrode and said metallic parts, and focusing the resulting electron flow caused by said negative potential at a restricted zone, producing a vaporization of said parts along their adjoining edges and an ionization between said parts and said arc electrode, by moving said adjoining edges into said restricted zone, and traversing said adjacent edges through said restricted zone, whereby a welding arc will be struck between said arc electrode and said adjoining edges, as said edges move through said restricted zone.

8. Method for arc welding a pair of metallic parts, comprising the steps of disposing in an evacuated zone an arc electrode, an electron source adapted to produce when energized an electron beam focused on a restricted zone, and said metallic parts, with the edges thereof along which the welding is to be carried on disposed in adjoining position and traversing said restricted zone, applying an operative low welding voltage between said parts and said arc electrode, energizing said electron source by applying across said source and said parts a high potential, thereby hitting with an electron beam said restricted zone and producing a material vaporization of said metallic parts in said restricted zone, the produced metallic vapors ionizing the path between said restricted zone and said arc electrode thereby striking an electric arc between said parts and said arc electrode, and moving said adjoining edges relatively to said restricted zone.

9. Method for arc welding a pair of metallic parts, comprising the steps of disposing in an evacuated zone an arc electrode, an electron source adapted to produce when energized an electron beam focused on a restricted zone, and said metallic parts, with the edges thereof along which the welding is to be carried on disposed in adjoining position and traversing said restricted zone, applying an operative low welding voltage between said parts and said arc electrode, energizing said electron source by applying across said source and said parts a high potential, thereby hitting with an electron beam said restricted zone and producing a material vaporization of said metallic parts in said restricted zone, the produced metallic vapors ionizing the path between said restricted zone and said arc electrode thereby striking an electric arc between said parts and said arc electrode, and moving said adjoining edges relatively to said restricted zone, the substitution of the low welding voltage by the high starting voltage being controlled by the variations of the potential difference between said parts on the one hand and said arc electrode and electron source on the other hand.

References Cited in the file of this patent

UNITED STATES PATENTS

| | | |
|---|---|---|
| 1,373,054 | Chubb | Mar. 29, 1921 |
| 1,615,995 | Muller | Feb. 1, 1927 |

FOREIGN PATENTS

| | | |
|---|---|---|
| 371,165 | Great Britain | Apr. 21, 1932 |